(12) United States Patent
Coull et al.

(10) Patent No.: US 12,505,210 B2
(45) Date of Patent: Dec. 23, 2025

(54) GAMIFICATION THROUGH THREAT HUNT PACKS AND/OR THREAT HUNTING FUNCTIONS

(71) Applicant: Google LLC, Mountain View, CA (US)

(72) Inventors: Scott Eric Coull, Cary, NC (US);
Jeffrey Thomas Johns, Leesburg, VA (US)

(73) Assignee: GOOGLE LLC, Mountain View, CA (US)

( * ) Notice: Subject to any disclaimer, the term of this patent is extended or adjusted under 35 U.S.C. 154(b) by 294 days.

(21) Appl. No.: 18/309,392

(22) Filed: Apr. 28, 2023

(65) Prior Publication Data

US 2024/0362323 A1   Oct. 31, 2024

(51) Int. Cl.
G06F 21/55   (2013.01)

(52) U.S. Cl.
CPC ...... *G06F 21/554* (2013.01); *G06F 2221/034* (2013.01)

(58) Field of Classification Search
CPC .................................................. Y10S 707/948
See application file for complete search history.

(56) References Cited

U.S. PATENT DOCUMENTS

| | | | | |
|---|---|---|---|---|
| 10,104,097 | B1* | 10/2018 | Yumer | H04L 63/20 |
| 11,475,370 | B2* | 10/2022 | Keech | G06F 8/436 |
| 11,494,285 | B1* | 11/2022 | Manthey | G06F 11/3604 |
| 2016/0148280 | A1* | 5/2016 | Marth | G06Q 30/0269 |
| | | | | 705/14.42 |
| 2016/0277435 | A1* | 9/2016 | Salajegheh | H04W 12/12 |
| 2018/0365420 | A1* | 12/2018 | Krylov | G06F 16/00 |
| 2019/0207967 | A1* | 7/2019 | Vashisht | H04L 63/1408 |
| 2022/0147815 | A1* | 5/2022 | Conwell | H04L 63/1425 |
| 2022/0309416 | A1* | 9/2022 | Barday | G06Q 10/067 |
| 2022/0327204 | A1* | 10/2022 | Abbaszadeh | H04L 63/1408 |
| 2023/0205880 | A1* | 6/2023 | Ulasen | G06F 21/53 |
| | | | | 726/23 |

(Continued)

OTHER PUBLICATIONS

Biscopink, Karen, "How Top Developer and Editors' Choice Badges Showcase Googleas Favorite Apps", Sensor Tower, https://sensortower.com/blog/how-top-developer-and-editors-choice-badges-showcase-googles-favorite-apps (Wayback Machine, Oct. 17, 2015) (Year: 2015).*

(Continued)

*Primary Examiner* — Tod R Swann
*Assistant Examiner* — Amir Mahdi Hajiabbasi
(74) *Attorney, Agent, or Firm* — DORITY & MANNING P.A.

(57) ABSTRACT

A non-transitory storage medium includes logic associated with a cybersecurity threat hunting system. Upon execution, the logic analyzes input event data to detect whether the input event data constitutes a cyberthreat. The logic includes a function evaluator, which is configured to extract features from the input event data that is relevant, based on experiential knowledge or past analyses, for use in determining whether one or more cyberthreats are associated with the input event data. The function evaluator includes one or more hunt packs, each of the one or more hunt packs includes one or more hunting functions, and each hunting function of the one or more hunting functions is configured to analyze the input event data received from at least one cybersecurity source.

22 Claims, 7 Drawing Sheets

(56) References Cited

U.S. PATENT DOCUMENTS

2023/0289604 A1* 9/2023 Chan ................... G06F 21/577

OTHER PUBLICATIONS

G2, "Best Static Code Analysis Tools", https://www.g2.com/categories/static-code-analysis (Wayback Machine, May 2, 2020) (Year: 2020).*
Glenfezap, 'App Download Milestone Reward/Recognition', https://developer.apple.com/forums/thread/88318 (Wayback Machine, Jul. 23, 2022) (Year: 2022).*

* cited by examiner

GAMIFICATION THROUGH THREAT HUNT PACKS AND/OR THREAT HUNTING FUNCTIONS

FIELD

Embodiments of the disclosure relate to the field of cybersecurity. More specifically, one embodiment of the disclosure relates to a system and method configured to identify and analyze cybersecurity threats using innovative Machine Learning (ML) techniques based on event data.

GENERAL BACKGROUND

Cybersecurity attacks have become a pervasive problem for enterprises as many computing devices and other resources have been subjected to attack and compromised. A "cybersecurity threat," sometimes referred to as a "cyber-threat," constitutes a threat to security, typically, with the potential to harm an information system (e.g., network or computing device connectable to a network).

Cybersecurity threats can involve the infiltration into an enterprise's network or device by software designed to perpetrate malicious or criminal activity or even a nation-state attack (e.g., "malware"). Cybersecurity threats can also include insider attacks that originate within a targeted enterprise when the threat is perpetrated by current or former employees or others with authorized or unauthorized access to the enterprise's network. Cybersecurity threats can use stolen credentials of authorized users. Each cybersecurity threat has the potential of being actualized into a cybersecurity attack (hereinafter, "cyberattack").

Perpetrators of cyberattacks typically employ tools, techniques, and procedures ("TTPs") intended to breach (e.g., gain unauthorized access) and/or conduct unauthorized activities in information systems. These bad actors often employ malware designed to compromise the information systems, though, as noted above, human error can also allow intrusion into the information systems. Knowledge of TTPs of perpetrators, the attacked enterprises, and the effects of prior known attacks allows cybersecurity analysts to identify, analyze and classify cyber security threats.

More specifically, cybersecurity analysts conduct threat hunting by manually investigating data elements (e.g., collected chunks of data, such as network data, computer code, logged events, or other input data) for cybersecurity threat associated with information systems, and then classifying those data elements into useful classes, such as either malicious or benign (non-malicious), or into other classification schemas, such as malicious, benign, or suspicious. Cybersecurity analysts may, for instance, staff security operation centers using interactive control terminals that allow them to monitor and manage security risks at enterprises subscribing to their services. Cybersecurity analysts are also employed in cybersecurity incidence response services, for example, to inform attack victims of the nature and impact of cyberattacks and initiate responses to the cyberattacks.

Cybersecurity analysts may uncover malware, or unauthorized access or activities, for example, through analyzing reported or logged events. The analysis may identify indicators of compromise (IoCs) related to, for example, unauthorized, unusual, or suspicious activities or occurrences, and/or TTPs of bad actors. Alternatively, or in addition, analysts can employ network penetration ("pen") testing and other investigatory practices to determine a threat potential (e.g., vulnerability) and thus an enterprise's cybersecurity threat posture. Unfortunately, performing these sorts of analyses has relied excessively on human analysts, who are subject to human inefficiencies and inaccuracies and whose efforts do not scale well. Moreover, retaining qualified human analysts may be difficult since they are in high demand and in short supply.

Not all cybersecurity analysts and their practices are equally reliable. Great skill and experience are often required on the part of the analysts to accurately analyze a cybersecurity threat, particularly, a relatively advanced and complicated threat. This analysis is intended to produce high confidence conclusions on the nature and severity of the cybersecurity threat.

Cybersecurity analysts and engineers have developed, often unique, practices to analyze data elements collected from information systems. For example, one practice includes the development of static rules (e.g., "if this, then that") to identify cybersecurity threats. Unfortunately, these static rules have shown themselves to be relatively inflexible and unreliable in dealing with the fast-evolving threat landscape and do not lend themselves to scaling in order to process greater amounts of data for cybersecurity threat evaluation. Accordingly, this heuristic approach has proven inadequate to classify accurately the increasingly complicated and numerous types of cybersecurity threats.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Figure 1A:
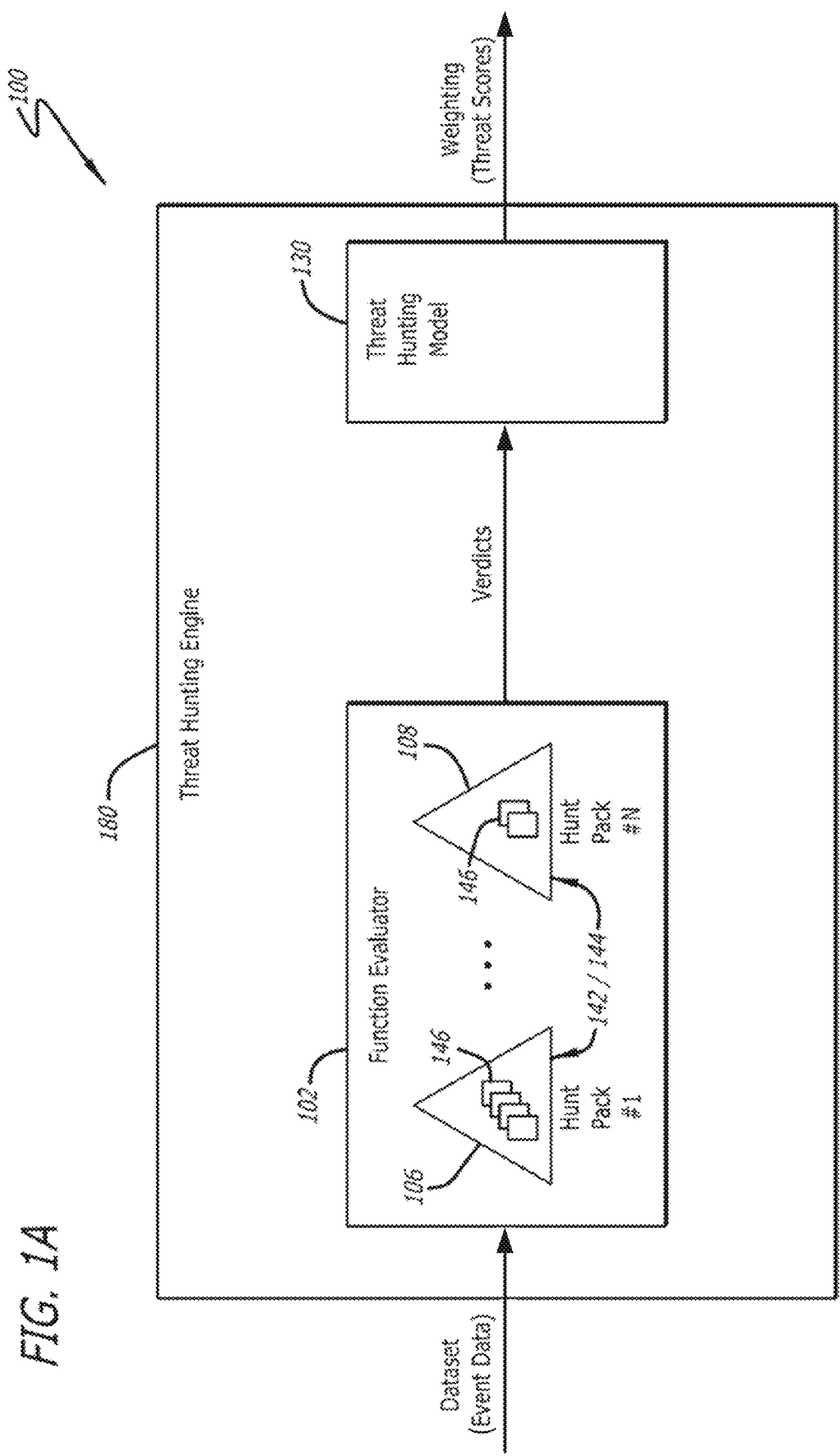
FIG. 1A is a block diagram of an exemplary embodiment of a function evaluator featured as part of a threat hunting engine deployed as part of a cybersecurity threat hunting system.

Embodiments of the present disclosure provide a cybersecurity threat hunting system configured to generate, train, and subsequently deploy into production an ML-based threat hunting engine, which includes one or more hunting functions (sometimes referred to as "hunting function(s)") and a ML model. The hunting function(s) are configured to conduct analytics on extracted features (e.g., event data or data elements associated with a training dataset) to generate verdicts, which are output to the ML model for use in training of weightings (e.g., weighted quality metrics representative of confidence level) applied to each of the hunting functions (or a hunt pack including the hunt function) deployed as part of the ML model. The ML model is operable to analyze event data for use in identifying, analyzing, and classifying cybersecurity threats (hereinafter, "threats"). Herein, for this illustrative embodiment, the threat hunting system performs analytics in an automatic fashion (without human intervention) on event data to uncover those events that signify cybersecurity threats.

According to one embodiment of the disclosure, the cybersecurity threat hunting system may be deployed on-premises, or in a hosted service, such as a cloud-based hosted service, locally hosted service, or a combination thereof (called a hybrid deployment), any of which operates to generate an identification of threats, an associated cybersecurity threat score, and related information applicable to a subscriber or enterprise ("enterprise"). As shown below, the cybersecurity threat hunting system may be deployed as part of a security operations center (SOC) adapted to receive and analyze input event data from cybersecurity data sources associated with an enterprise.

Herein, the event data may be provided directly or indirectly from the cybersecurity data sources, which often include dedicated security control devices ("security controls") operating to protect the enterprise. These security controls may include, but are not limited or restricted to firewalls, network malware detection systems, intrusion detection systems, endpoint agents, or the like. The cybersecurity threat hunting system may be adapted to receive, as input data, event data pertaining to activities and/or behaviors of a user, computing device, and/or network. The event data may also be provided in the form of alerts from the security controls. The event data may also be provided from an enterprise source that logs events, such as, for example, MICROSOFT® WINDOWS® event logs, which provide an audit trail of events (both benign and possibly malicious) that occur in a WINDOWS® operating system.

During training phase, the cybersecurity threat hunting system includes a function evaluator, which includes one or more hunting functions (hereinafter, "hunting function(s)") that are included as part of one or more hunt packs. Each of the hunting functions is configured to extract certain data elements from a "training" dataset (sometime referred to as the "features"), which are relevant in the determination of cybersecurity threats. The extracted features are particularly useful when the dataset (e.g., input event data for training of the ML model) constitutes, for example, too large and/or over-inclusive a dataset to be itself processed efficiently by the ML model. Different hunting functions may extract and process different features based on the targeted operability of the hunting function. Each of the hunting function(s) produces a "verdict" (e.g., a value representing a probability level of the feature being associated with a cyberattack) as an output based on an analysis of the extracted feature or group of features defined in the hunting function. The outputs are provided to an ML model, which uses these output to compute weightings (e.g., confidence level) for each hunt function. These learned weightings may be used during inference phase to determine the event threat score and/or aggregate threat score associated with incoming event data provided for analysis.

More specifically, the cybersecurity threat system can operate in a training mode or production mode and can be viewed as architecturally separated into (i) a model generation subsystem to generate and train an ML model and (ii) at least one threat detection subsystem. The model generation subsystem is configured to generate and train an ML model (e.g., an executable programmatic function implementing machine learning techniques). The model generation subsystem may be further configured to provide the trained ML model to a threat detection subsystem, though the ML model may be deployed to operate within a plurality of threat detection subsystems. Communicatively coupled to a network, each threat detection subsystem is configured to receive event data from the same network as the others or from different networks, and/or from the same enterprise or from different enterprises. The threat detection subsystem executes the trained ML model produced by the model generation subsystem to conduct threat analyses on the received event data to discover potential threats. In some embodiments, the model generation subsystem and the threat detection subsystem may be executed as software deployed on a single computer platform, or on different computer platforms coupled for digital communication by a network.

Herein, embodiments of the present disclosure generally relate to a cybersecurity threat hunting system and method. The threat hunting system includes (and in some embodiments, generates) a threat hunting engine, which includes a function evaluator for threat hunting and an ML model for producing threat scores, in accordance with embodiments of the invention. The function evaluator is designed in modular fashion to include one or more hunt packs, each hunt pack is composed of one or more hunting functions. Each hunting function analyzes a "training" dataset (e.g., inputted event data associated with communications, behaviors, occurrences, or other activity) collected from at least one cybersecurity source (e.g., computer network or computing device).

In some embodiments, each of the hunting functions is selected and configured to extract specific event data (e.g., a set of one or more data elements called "features") from the input event data for analysis. Each of these hunting functions is configured to produce a verdict as an output based on an analysis of the extracted feature or group of features, where the verdict indicates whether the feature or features is associated with a cyberattack. In some implementations, each hunting function produces a verdict in the form of a probability level for the feature expressing a likelihood that the feature is malicious or related to a cyberattack.

More specifically, each hunt pack can accept event data as input (e.g., data associated with a set of events such as alerts from other cybersecurity devices or event log entries), initiate analysis by one or more of its hunting functions, and output verdicts classifying each set of events in accordance with a selected class (e.g., benign, or malicious), within the context of what its constituent hunting functions examine. In accordance with one embodiment of the disclosure, each hunting function is designed specifically to identify a single activity or plural activities represented by the set of events as relevant to a determination of a cyberthreat. Each hunting function may then reach a verdict on maliciousness of the identified set of events, e.g., a single event or a combination, pattern, or sequence of events.

Where the verdict from the hunting function indicates maliciousness, the identified set of events may be provided for further analysis by an ML model, eventually resulting in an alert or report being generated and sent by a reporting engine or other action taken upon verification of maliciousness. The verification by the ML model takes the form of a threat score that captures the aggregate "belief" that a corresponding set of events is, for example, malicious or benign.

Viewed broadly, the threat hunting engine with its ML model proceeds through a training phase and then a production or inference phase. During the training phase, the ML model is tuned or adjusted based on the features extracted from a training dataset to learn reliability weighting for each of the hunting functions in the threat hunting engine. According to one embodiment of the disclosure, the reliability weighting may be learned by examining validity of the verdicts reached on the entire set of features in the training dataset. Those weightings, referred to as "weighted quality metrics" described below, are used in setting parameters of the ML model to weigh the individual verdicts from the corresponding hunting functions according to a computation of their respective accuracies, thereby improving the reliability of the threat scores produced by the ML model.

More specifically, the operability between the features from the event data, hunting function(s) and ML model may be incapsulated into a plurality of operations. First, the event data is sent to each of the possible applicable hunting function(s). Herein, each hunting function extracts features from the event data and applies its logic. The logic could be deployed as via simple rules or via ML models (which themselves will extract features from the event data and apply the ML model to those features). Next, the function will output one of malicious, benign, or abstain depending on the outcome of the function logic/ML model. Herein, the ML model of the threat hunting engine takes the hunting function outputs and uses them to train the weighted quality metrics (e.g., confidence level) for each hunting function. The weighted quality matrix are used as parameters of the trained ML model during inference to determine the aggregate threat score associated with event data under analysis.

Herein, a "hunt pack" includes one or more hunting functions (hereinafter, "hunting function(s)") and metadata associated with the hunting function(s). A "hunting function" is logic, which may be based on cybersecurity analysts' subject matter expertise in threat analyses and collected threat intelligence, designed specifically to identify (hunt for) a particular set of one or more cyberthreats. A hunting function may be configured in a number of different forms, and conceptually, the hunting function can be any computable function. Examples of a hunting function can include, but is not limited or restricted to YARA rules, machine learning (ML) models, heuristics, pattern matching, keyword search, or the like.

Each hunting function is an atomic computational function in some embodiments. The hunting function may be dedicated to hunt for a predetermined, specific cyberthreat or a range of cyberthreats. The range of cyberthreats may represent a recognized malware family or threat attacker or group, where the range is defined by and depends on the coverage of the hunting function and the TTP (tools, techniques, and procedures) implemented by a threat actor or group in previously discovered cyberthreats. The hunting function is configured to (i) receive input data (e.g., event data within event logs, audit logs, etc.), (ii) identify (e.g., extract) one or more events (defined below) within the input data for analysis, (iii) perform analytics on the identified events to determine one or more verdicts for the identified events on whether any of the events, alone or together with other events, are (for example) malicious or benign, and/or (iv) generate output data including the verdict(s) assigned to the input data along with the event(s) themselves associated with each verdict. Also, a hunting function may include one or more executable software modules or scripts, while in other embodiments, a hunting function may include at least one rules engine (e.g., executable software) and a plurality of logic statements called "rules" that can be processed by the rules engine to yield verdicts on identified events.

As described herein, the trained ML model operates to classify events, while considering the quality of the hunting functions deployed as part of the function evaluator. Each hunting function has a latent notion of quality in terms that express the effectiveness of a hunt pack or hunting function in accurately identifying and classifying event data as constituting a cyberthreat or not (e.g., malicious, or benign), respectively. The effectiveness of the hunt pack or hunting function may be represented by quality metrics in terms, for example, of true positive (TP), false positive (FP), true negative (TN) and false negative (FN) values. This "quality" encompasses the concepts of credibility, trustworthiness, and/or reliability.

During training of the ML model, in one embodiment, initial quality estimates of the hunting functions may be provided as initial values of adjustable parameters for the ML model, which can be adjusted (tuned) during training as further information about quality of the verdicts is obtained. The quality metrics can be described as latent or hidden because they are typically not overtly known; rather, quality metrics are inferred (learned) through the training process employed for the ML model. These learned quality metrics can be combined into a single probability.

For each feature discovered in the input data, the verdicts from the hunting functions can be combined into a single value. In an embodiment, each hunting function capable of forming a verdict on a particular feature does so through a "vote" (i.e., its verdict) on a classification of the feature and its vote is weighted by the learned quality metrics for that hunting function and aggregated with those of the other hunting functions voting on that feature. Thus, for example, a first hunting function vote on a feature of 'malicious' with a high TP value (or low FP value) influences the final classification or threat score by the ML model of an event consistent with an evaluated feature more than a second hunting function that votes 'benign' with a low TP (or high FP) value. The weighted quality metrics are thus reflected in the threat score generated by the ML model for each event/feature.

In contradistinction to the verdicts, the threat score is produced by the ML model (or post-processing logic operating on the output of the ML model) and represents a measure of confidence that the received event data is an actual and actionable cyberthreat. The threat score can be provided, for example, to mitigation logic or a security analyst to inform decisions regarding actions to be taken in response to cyberthreats, such as issuing or prioritizing alerts and/or selecting, prioritizing, or initiating remediations. In an example deployment, automated actions can be taken in response, e.g., to the threat score exceeding a threshold.

In an embodiment of the invention, in the training mode for the ML model, a cyberthreat threat hunting method includes receiving, at a compute device, (1) a training dataset including a first set of event data and cybersecurity classifications or verdicts from hunting functions that serve as votes, and optionally, (2) a set of initial quality values (also called anchor values) indicative of estimates of qualities of each of a set of threat hunting functions, where the anchor values can be used to initialize the ML model. The training dataset typically will include features extracted from event data that is evaluated against the hunting functions, where results produced by analytics conducted by the hunting functions on any or all aspects of a feature (e.g., signature, etc.) are expected (known). Each of the votes is associated with at least one event of the event data, and each vote from the first set of votes relates to a classification of that corresponding event or events (event(s)). The classification can place the corresponding event(s) in any of a plurality of predetermined classes, such as (and depending on the embodiment) (a) malicious or benign or (b) malicious, suspicious, or benign.

In one embodiment, an ML model is trained using an unlabeled training dataset and is based on (i) at least one of agreements among the sets of votes and disagreements among the sets of votes, and (ii) the set of initial quality metrics. After one or more training runs with appropriate adjustments from the initial values to the weighting parameters, the training produces a trained ML model. Optionally, the training of the ML model is also based on a regularization or constraint parameter, which indicates how far ML model can deviate from the set of initial quality values. The trained ML model and the function evaluator used in training the ML model form a threat hunting engine and stored for later use in classifying unclassified ("unlabeled") event data (or event data whose labels are questionable).

During a production or inference phase for the ML model, in response to receiving votes associated with features analyzed by different hunting functions, namely the verdicts (e.g., votes) from the hunting functions, these votes may be aggregated (and may be regarded as a second set of votes). The initial "votes" may represent a latent quality of each hunting function. When these votes are combined, a purpose of this system is to understand the latent quality of each hunting function and then combine them in flexible ways to generate a threat score representing the probability that the event data corresponds to a cyberattack or is benign.) Besides the hunting function(s) described above, a hunt pack further includes metadata associated with each hunting function and/or associated with the hunt pack at large. According to one embodiment of the disclosure, the metadata associated with each hunting function may be representative of its characteristics, such as: name of the developer ("creator"), creation date (to identify "aged" hunt packs), its purchase price (explained hereinbelow), its expected quality metrics/performance (based on a set as a default values for its quality metrics as suggested by its developer or set by initial comparison testing with other hunting functions, information identifying how the threat hunting function might be used in practice (e.g., network security, endpoint security, etc.), or other information that would be informative to any user of the hunting function. Similar types of metadata may be associated with the hunt pack (rather than or in addition to individual hunting functions within the hunt pack). The quality metrics for the hunt pack may be an arithmetic derivation (e.g., average, mean, median. weighted average, etc.) as an aggregate of the quality metrics of the component hunting functions forming the hunt pack.

In one embodiment, the hunt packs as a set can include one or more publicly available hunting packs (hereinafter, "public hunt pack(s)") and/or one or more hunt packs that are proprietary and/or are not available to the public-at-large (hereinafter, "private hunt pack(s)").

According to one embodiment of the disclosure, cybersecurity professionals of the customer (enterprise) may control selection of which combination of public hunt pack(s) and/or private hunt pack(s) are used to generate the verdicts used to tune the ML model. According to yet another embodiment of the disclosure, hunt pack selection logic deployed within the cybersecurity threat analysis system may control the selection of public hunt pack(s) and/or private hunt pack(s) used in the tuning of the ML model based on customer input data (e.g., receipt of enterprise data for which ML model is being created, data directed to security concerns of the enterprise, financials such as cost limits, etc.). According to yet another embodiment of the disclosure, the hunt pack selection logic may be configured to control the selection of public hunt packs without including any private hunting packs, thus the customer (enterprise) retains control over the selection and incorporation of private hunt pack(s), if any are available. The private hunt packs may include, for example, hunting functions developed by an enterprise or purchased for use by the enterprise from security vendors, and, individually, these can be referred to as "private hunting functions."

As used herein, a hunt pack can be of general utility to a plurality of enterprises (customers) and may be obtained from a public data store operating as a software marketplace (e.g., free, fee-based, etc.). The marketplace can be viewed as a public facing repository and the public hunt pack can be viewed as "open sourced" or available for public purchase. Each public hunt pack may be configured to detect threats associated with a particular threat type (e.g., threat actor designated threats, advanced persistent threats, ransomware, phishing, etc.); an industry such as utility (e.g., electrical power plant, hydro-electric plant, nuclear, etc.), a distribution channel (e.g., pipeline distribution center, port controls, etc.); a technology (e.g., semiconductor, social media, search engines, etc.); a geographic location; or the like. Additionally, or in the alternative, the public hunt pack may constitute a "semi-public" hunt pack, namely a hunt pack that is accessible by only customers of a specific security vendor.

In some embodiments, this marketplace allows gamification of the hunt packs and/or hunting functions for the cybersecurity threat analysis system, where awards (e.g., royalties, monetary payments, subscription services, tokens, etc.) may be earned by authors or suppliers of public hunt packs. The "winner" of the contest or game can be named in response to (i) one or more triggering events (e.g., public hunt pack is elevated to or remains on a "top hunt pack listings" on a public or customer website (e.g., GitHub) by reviewers, or (ii) triggering condition (e.g., public hunt pack having the highest measurable quality or effectiveness value as described extensively below). For example, the measurable quality constitutes the quality of a hunt pack being able to detect malicious activity high number of detections, high "true positive" (TP) rate as measured by the ML model training) and low benign detection (e.g., low "false positive" (FP) rate as measured by ML model training).

A private hunt pack is generally a proprietary or specialized software module suitable for use by a particular enterprise or particular situation in which the enterprise finds itself. The private hunt pack is selected to allow an enterprise to concentrate its hunting for threats based on its attributes or situations, such as its direct knowledge of its computing environment such as infrastructure, non-standard applications and behaviors that should be monitored more closely (e.g., industrial controls for utilities for example), known cyber-risks targeting similarly situated enterprises or the particular enterprise, or the like, as well as, in some cases, discovered or reported security vulnerabilities of security controls. In lieu of being stored on a publicly accessible software marketplace, the private hunt packs are maintained within secured storage (hereinafter, "private data store")

accessible by the customer or on behalf of the customer (e.g., an enterprise or an authorized representative for the enterprise such as a security vendor) via a portal. The portal provides an "interface" for the customer and its authorized users to access a cloud-based (or on-premises) private data store to enable the customer or an entity acting on behalf of the customer to upload/modify/delete private hunt packs as well as, based on customer action and/or access permission, provide the private hunt packs to the model generation subsystem to produce an ML model for testing and subsequent release.

More specifically, public hunt pack(s) and/or the private hunt pack(s) may be selected by the customer or selected automatically by the threat hunting system based on the type of threat protection needed or wanted by an enterprise. Moreover, a public hunt pack may be customized for a customer and thus converted into a private hunt pack.

Hunt packs and hunting functions can be evaluated by at least comparing their associated quality metrics and coverage values. As noted, quality metrics reflect assessments of accuracy or reliability ("quality") of the individual hunt packs and their component hunting functions. The quality metric associated with a hunt pack can be computed as an arithmetic derivation (e.g., average, mean, median, weighted average, etc.) of an aggregate of the quality metrics associated with their component hunting functions, and can be updated iteratively based on analytics of the hunt pack and/or component hunting functions during training of an ML model.

As described above, the quality metrics may be represented by some or all of the following: a "true positive" (TP) value (e.g., numerical value, percentage, ratio, rate, etc.), a "false positive" (FP) value, a "true negative" (TN) value, and/or a "false negative" (FN) value. Herein, a first subset of quality metrics (TP, TN) may be determined by agreement between (i) the hunting function assigning, for example, a first label (malicious-TP; benign-TN in a bipolar or two-state classification approach) to one or more datasets and, (ii) a configurable threshold (e.g., a majority) of other similarly-situated hunting functions (e.g., hunting functions conducting analytics of the same security-related event data) assigning the first label as well. A second subset of quality metrics (FP, FN) may be determined by disagreement as to an inconsistent label assignment (classification) with a majority of other similarly situated hunting functions. A benchmark value may constitute, for example, selected TP/FP/TN/FN values expected for threat hunting models operating to prescribed standards. Where multi-class classifications (indicating more than two classes) are used, such as malicious, benign, and suspicious, the agreement/non-agreement determination may be made against the largest plurality of the total votes for the hunting functions rather than the majority.

A coverage value expresses a scope of hunting capability built into a hunt pack or hunting function, or, when stated differently, the coverage value is a measure of the capability of a hunt pack and/or hunting function to identify and classify features including in the input event data. The coverage value thus represents the number of events or percentage of total events within datasets (or event data) being analyzed that the hunting function is adequately designed to analyze and classify, and thus, for which the hunting pack is capable of entering a vote (e.g., malicious, or non-malicious). It should now be clear that a hunting function or hunt pack can be designed to analyze and classify certain "types" of events.

Where a hunting function is associated with a low coverage value, it is not capable of entering a vote with regard to a particular event (e.g., extracted feature) or type of event. Thus, if that event is contained in the input event data, the hunting function will need to abstain from voting (i.e., enter an abstention). On the other hand, the hunting function will be associated with a high coverage value where it has broader capability of classifying different types of events discovered in the input event data, and will not need to abstain as often. Stated differently, the coverage value indicates the number of the events or the percentage of the total number of events (or types of events, in each case) that are classified by the hunting function as an indication of its capability to vote or its capability to avoid entering an abstention.

During a training phase, in some embodiments, the model generation subsystem may operate in a first training mode (unsupervised) and a second training mode (semi-supervised). During the first training mode, unlabeled data may be used as the training datasets in which operability of ML model may be evaluated based on the quality metrics described above. However, during the second training mode, the unlabeled data may be augmented with a small amount of labeled data (e.g., less than ten percent of the unlabeled data) to confirm quality values based on awareness of labels of certain events within the security-related event data and their comparison with verdicts reached by the hunt packs and/or hunting functions.

Besides an initial setting of quality metrics for each of the hunt packs by its developer, the determination and setting of the quality metric for the hunt pack may be conducted iteratively based on analytics conducted on selected (training) datasets by hunting functions within the hunt packs to determine quality metrics (TP, FP, TN, FN) and coverage values (event_number or event_percentage) associated with each hunt pack. If the quality metric of a hunt pack satisfies a first threshold, representative of a desired value at which the hunt pack is operating to detect threats pertaining to the training datasets, the hunt pack may be retained. For hunt pack(s) that fail to satisfy the first threshold, according to one embodiment of the disclosure, those hunt pack(s) may be substituted by other hunt packs(s), or additional hunt pack(s) may be added to improve operability. Thus, post-analysis logic can be used to identify any performance deficiencies in the threat analytics such as hunt packs and/or hunting functions that are operating below selected quality benchmarks and recommend replacement hunt pack(s) and/or hunting function(s) with better operating hunting pack(s) and/or hunting function(s).

Accordingly, as described above, the determination and setting of the quality metric for each hunting function, deployed within the hunt packs, may be conducted iteratively based on analytics on these hunting functions to determine quality metrics (TP, FP, TN, FN) and coverage (event_number, event_percentage) for each hunting function. Moreover, as described above, the quality metrics may be based, at least in part, on labeling agreements and disagreements with other similarly situated hunting functions within the hunt pack that are conducting analytics of the same security-related event data and coverage may be based on labeling availability by the hunting function.

If the quality metrics of a hunting function satisfies a second threshold, representative of a desired value in which the hunting function has operability to detect threats pertaining to the training datasets, the threat hunting function may be retained as part of a hunt pack under evaluation. For hunting function(s) that failed to satisfy the second threshold, according to one embodiment of the disclosure, those hunting function(s) may be substituted for other hunting function(s) or additional hunting function(s) may be added to improve operability of the hunting function(s). Additionally, or in the alternative, the hunting function(s) may be retained, where the hunt pack including the failed hunting function significantly exceeds the first threshold signifying that the hunt pack is correctly operating, and modification of the hunt pack may not be warranted or wanted at that time.

Herein, the trained threat hunting model is provided to the threat detection subsystem, which may be located, for example, in a cybersecurity operations center. The threat detection subsystem may receive event data from security controls, which are supplied to the hunting function(s)/hunt pack(s). The hunting functions maintained within the hunt packs conduct analytics on the event data to yield a "vote" on the classification to be assigned to identified features within the event data. The resulting outcomes (votes) from the hunting function(s)/hunt pack(s) are supplied to the ML model. The votes of the hunting functions may be weighted in accordance with the quality metric determined for that hunting function so that the "votes" (suggested labeling) of more consistent hunting functions is given more weight in the overall classification by the ML model than less consistent hunting functions. The ML model classifies the input event data to identify cyberthreats with an aggregate threat score.

I. Terminology

In the following description, certain terminology is used to describe aspects of the invention. In certain situations, the terms "engine," "logic" and "component" are representative of hardware, firmware, and/or software that is configured to perform one or more functions. As hardware, the engine (or logic or component) may include circuitry having data processing and/or storage functionality. Examples of such circuitry may include, but are not limited or restricted to a processor, a programmable gate array, a microcontroller, an application specific integrated circuit, wireless receiver, transmitter and/or transceiver circuitry, semiconductor memory, or combinatorial logic.

Alternatively, or in combination with the hardware circuitry described above, the engine (or logic or component) may be software in the form of one or more software modules, which may be configured to operate as its counterpart circuitry. For instance, a software module may be a software instance that operates as a processor, namely a virtual processor whose underlying operations is based on a physical processor such as virtual processor instances for Microsoft® AzureR or GoogleR Cloud Services platform or an EC2 instance within the Amazon AWS infrastructure, for example.

Additionally, a software module may include an executable application, a daemon application, an application programming interface (API), a subroutine, a function, a procedure, an applet, a servlet, a routine, source code, a shared library/dynamic load library, or even one or more instructions. The software module(s) may be stored in any type of a suitable non-transitory storage medium, or transitory storage medium (e.g., electrical, optical, acoustical, or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, a hard disk drive, an optical disc drive, a portable memory device, or cloud-based storage (e.g., AWS S3 storage, etc.), as described below. As firmware, the engine (or logic) may be stored in persistent storage.

The term "events" generally represents data related to activities and/or behaviors of a computing device and/or communications across a network. As illustrative examples, an event may constitute (i) one or more monitored activities and/or behaviors of a computing device or a user or administrator (e.g., logins, network connectivity, etc.), and/or (ii) security-related event data such as firewall logs, endpoint security events, security alerts, or the like. Events may include verdicts from cybersecurity analysts or analysis tool or system, which may serve to label the events as benign or malicious, such as labeling a set of one or more indicators as IoCs.

The term "computerized" generally represents that any corresponding operations are conducted by hardware in combination with software and/or firmware.

The term "computing device" should be generally construed as physical or virtualized device with data processing capability and/or a capability of connecting to any type of network, such as a public cloud network, a private cloud network, or any other network type. Examples of a computing device may include, but are not limited or restricted to, the following; a server, a router or other intermediary communication device, an endpoint (e.g., a laptop, a smartphone, a tablet, a desktop computer, a netbook, IoT device, industrial controller, etc.) or virtualized devices being software with the functionality of the computing device.

The term "message" generally refers to as information placed in a prescribed format that is transmitted in accordance with a suitable delivery protocol or accessible through a logical data structure such as an Application Programming Interface (API) or a web service or service such as a portal. Examples of the delivery protocol include, but are not limited or restricted to HTTP (Hypertext Transfer Protocol); HTTPS (HTTP Secure); Simple Mail Transfer Protocol (SMTP); File Transfer Protocol (FTP); iMESSAGE or iCLOUD Private Relay; Instant Message Access Protocol (IMAP); or the like. For example, a message may be provided as one or more packets, frames, or any other series of bits having the prescribed, structured format.

A "customer" generally refers to an enterprise, representative for the enterprise, or an authorized agent for the enterprise such as, for example, an entity acting on behalf of the enterprise as a security vendor.

A "cybersecurity analyst" is a "subject matter expert" who identifies, analyzes, and directs the response to impactful cyberattacks. He/She understands cybersecurity and cyberthreats in general as well as the cyberthreat landscape for a particular enterprise—ranging from the parochial threat circumstances (nature of specific threats faced by the enterprise, or its geography or industry, for example) and its security posture (e.g., its deployed security controls and practices) all the way to current global security-related events such as trade wars or hot wars.

A "hunt pack" includes one or more hunting function(s) for example, and metadata associated with each of the hunting function and the hunt pack. As described above, a "hunting function" is logic, which may be based on cybersecurity analysts' subject matter expertise in threat analyses and collected threat intelligence, designed specifically to identify (hunt) for a particular set of one or more cyberthreats. The function may be dedicated to hunt for a single, specific cyberthreat, or a range of cyberthreats, such as those of a recognized family which is defined by and depends on the coverage of the hunting function and the TTP (tools, techniques, and procedures) implemented by a threat creator in known cyberthreats. In form, the hunting function may include any combination of executable, rule(s), regular expression(s), lookups in knowledge bases, queries to other machine learning models, or other information to identify data associated with potential malicious activity.

As a cloud-based hosted service, the cybersecurity threat hunting system may be configured to operate as a multi-tenant service; namely, a service made available to tenants (e.g., separate enterprises) on demand via a public network (e.g., Internet). The multi-tenant service may feature virtual resources, such as virtual processors, virtual machines, and/or virtual data stores that are based on functionality provided from physical processors and non-transitory storage medium. These resources are partitioned for shared use of the physical components among the enterprises in accessing and/or analyzing data maintained within that enterprise's specific cloud account. The partitioning protects the security and privacy of the enterprise data when uploaded into a data store of the cloud account for delivery to the cybersecurity threat hunting system. In contrast, as a locally hosted service, the cyberthreat threat hunting system may be configured as a single-tenant service installed on on-premises server(s) at the enterprise. Similar to its multi-tenant service architecture, the cybersecurity threat hunting system may feature resources, such as one or more processors and/or one or more data stores, which may be physical components or virtual components based on functionality provided from the physical components. Event data may be included as part of the input data made available to the cybersecurity threat hunting system for analysis.

In certain instances, the terms "compare," comparing," "comparison," or other tenses thereof generally mean determining if a match (e.g., identical or a prescribed level of correlation) is achieved between information associated with two items under analysis. Also, the phrase "one or more" may be denoted by the symbol "(s)" such as "one or more elements" may be represented as "element(s)."

Finally, the terms "or" and "and/or" as used herein are to be interpreted as inclusive or meaning any one or any combination. As an example, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

II. Architecture-Threat Management System

Referring to FIG. 1A, a block diagram of an exemplary embodiment of a cybersecurity threat hunting system 100 is shown. The threat hunting system 100 is configured to generate, train, and subsequently deploy into production an ML-based threat hunting engine 180. The threat hunting engine 180 includes a function evaluator 102 communicatively coupled to a threat hunting (ML) model 130. The function evaluator 102 includes one or hunting functions 146, which serve to (i) extract features from event data input which are of relevance (based on experiential knowledge and past analysis) and (ii) analyze the features, which may be a subset of features associated with the event data, to identify whether cybersecurity threats are contained in the event data. The output from each of the hunting function(s) 146 includes the verdicts on whether the features are potentially associated with a cyberattack. The function evaluator 102 output is provided to the ML model 130. The ML model 130 serves to analyze the verdicts to provide an indication of cybersecurity risks associated with the input event data.

The function evaluator 102 may be configured to include one or more hunt packs 142/144 designated as a first hunt pack ("hunt pack 1") through a $N^{th}$ hunt pack ("hunt pack N"). Each of the hunt packs 142/144 may be public and/or private hunt packs (see FIG. 1B) and is selected and configured to identify and analyze various predetermined characteristics, attributes and/or other features of individual events or combinations of events included in the event data. Each of the hunt packs 142 includes one or more hunting functions 146, which, in some embodiments, are each specialized to identify and analyze certain predetermined features, which are a subset of those to be identified by the hunt pack of which it is a component part. These features may be peculiar to a cyberattack or may be non-definitive as to whether they mark a cyberattack since they may also occur during computer operations that do not involve a cyberattack. The combination of such features may be more strongly indicative of a cyberattack. The first hunt pack (hunt pack 1) may be directed to hunting for features of a phishing type cyberattack while the $N^{th}$ hunt pack may be directed to hunting for features of a ransomware type cyberattack, for example.

The ML model 130 employs machine learning techniques to analyze the output (e.g., verdicts generated based on analyzed features) from the features extractor 102 to produce and output a threat score indicative of whether the analyzed event data is associated with a cyberattack. The ML model 130 in one embodiment is trained using the hunting functions included in the function evaluator 102 that will be used in production to protect the enterprise.

According to one embodiment of the disclosure, the threat hunting engine 180 may be deployed on-premises or in a hosted service, such as a cloud-based hosted service, locally hosted service, or a combination thereof (called a hybrid deployment), any of which operates to generate an identification of threats, an associated cybersecurity threat score, and related information applicable to a subscriber or enterprise ("enterprise"). As a on-premises deployment, the threat hunting engine 180 may constitute the core components distributed as a software module to be integrated in (e.g., plug-in) and executed as part of the threat hunting system 100.

From the foregoing description, and by way of summary, the data flow of the threat hunting engine 180 is as follows:
Event Data->Function Evaluator->Verdicts->ML Model->Threat Score Referring to FIG. 1B, a block diagram of an exemplary embodiment of cybersecurity threat hunting system 100 is shown. Herein, the cybersecurity threat hunting system 100 may be configured to operate in a threat pre-production stage (e.g., threat model creation, testing, quality metric assignment phases) and a threat post-production stage (e.g., threat analytics phase, quality value updating phase, etc.), as described below.

Figure 1B:
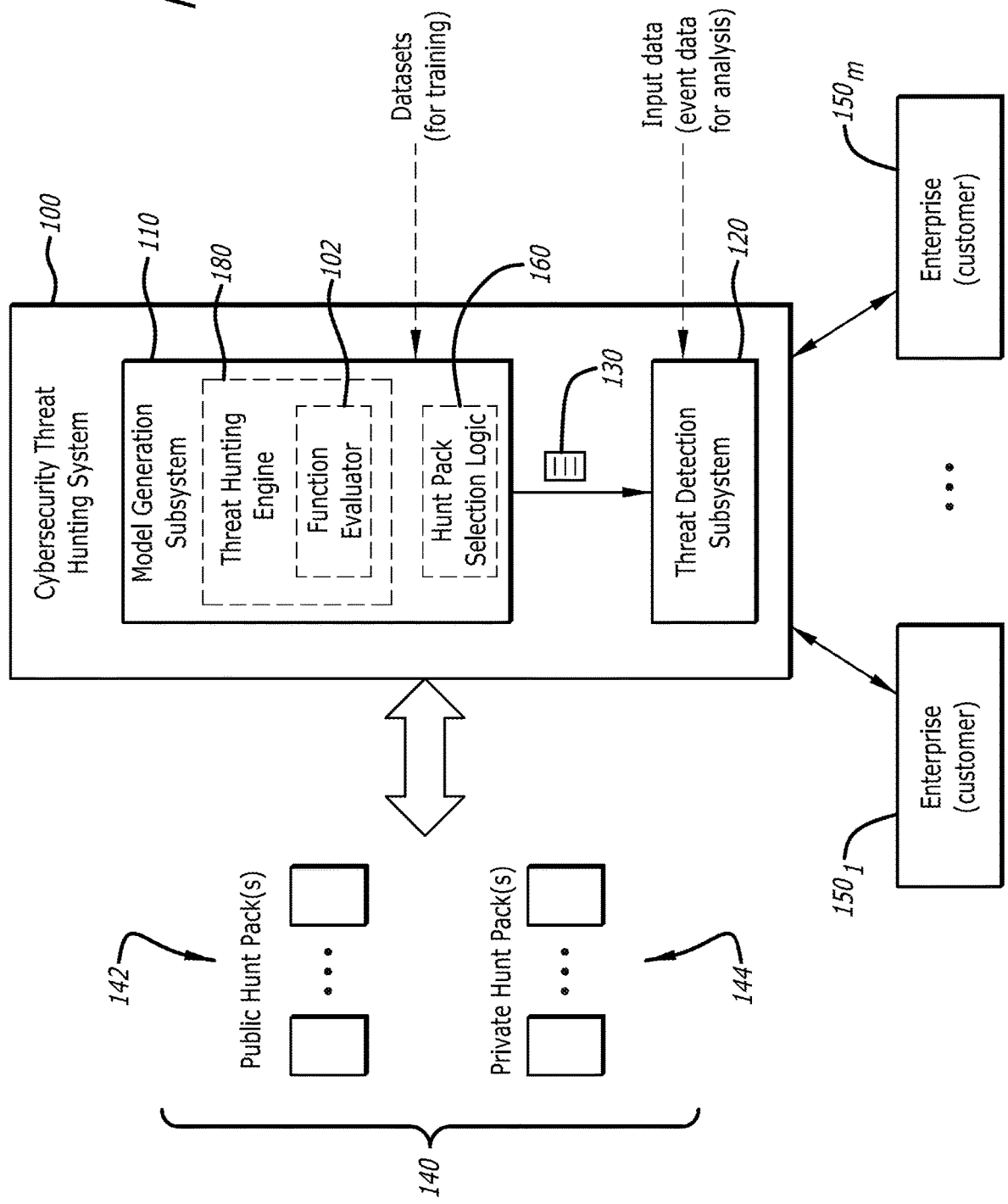
FIG. 1B is a block diagram of an exemplary embodiment of the cybersecurity threat hunting system.

As shown in FIG. 1B, the cybersecurity threat hunting system 100 features (i) a model generation subsystem 110 and (ii) a threat detection subsystem 120. According to one embodiment of the disclosure, the model generation subsystem 110 is configured to generate the ML model 130 operable on verdicts generated by selected hunting function(s) 146, which are part of the collected threat intelligence 140 and deployed within the function evaluator 102. As shown, the collected threat intelligence 140 includes one or more public hunt packs 142 (hereinafter, "public hunt pack(s)") and/or one or more private hunt packs 144 (hereinafter, "private hunt pack(s)"). The selection of the public hunt pack(s) 142 and/or the private hunt pack(s) 144 may be conducted by an enterprise (or its cybersecurity vendor). As shown, the cybersecurity threat hunting system 100 is a multi-tenant service accessible by a first customer associated with to a first enterprise 150₁ up to a $M^{th}$ customer associated with an $M^{th}$ enterprise $150_M$ (M>1).

Additionally, or in the alternative, selection of the public hunt pack(s) 142 and/or the private hunt pack(s) 144 to operate as part of the function evaluator 102 may be conducted automatically by hunt pack selection logic 160. Herein, the hunt pack selection logic 160 is deployed as part of the model generation subsystem 110 within the cybersecurity threat hunting system 100 and configured to automatically control selection of the public hunt pack(s) 142 and/or the private hunt pack(s) 144 in creating the function evaluator 102. This selection may be based on data representing the general prevailing threat landscape, pre-installed customer input data such as enterprise data, security concerns of the enterprise, financial constraints (e.g., maximum costs per annum), effectiveness of public/private hunt packs against datasets representative of customer's input data, or the like.

III. Architecture-Model Generation Subsystem

Figure 2:
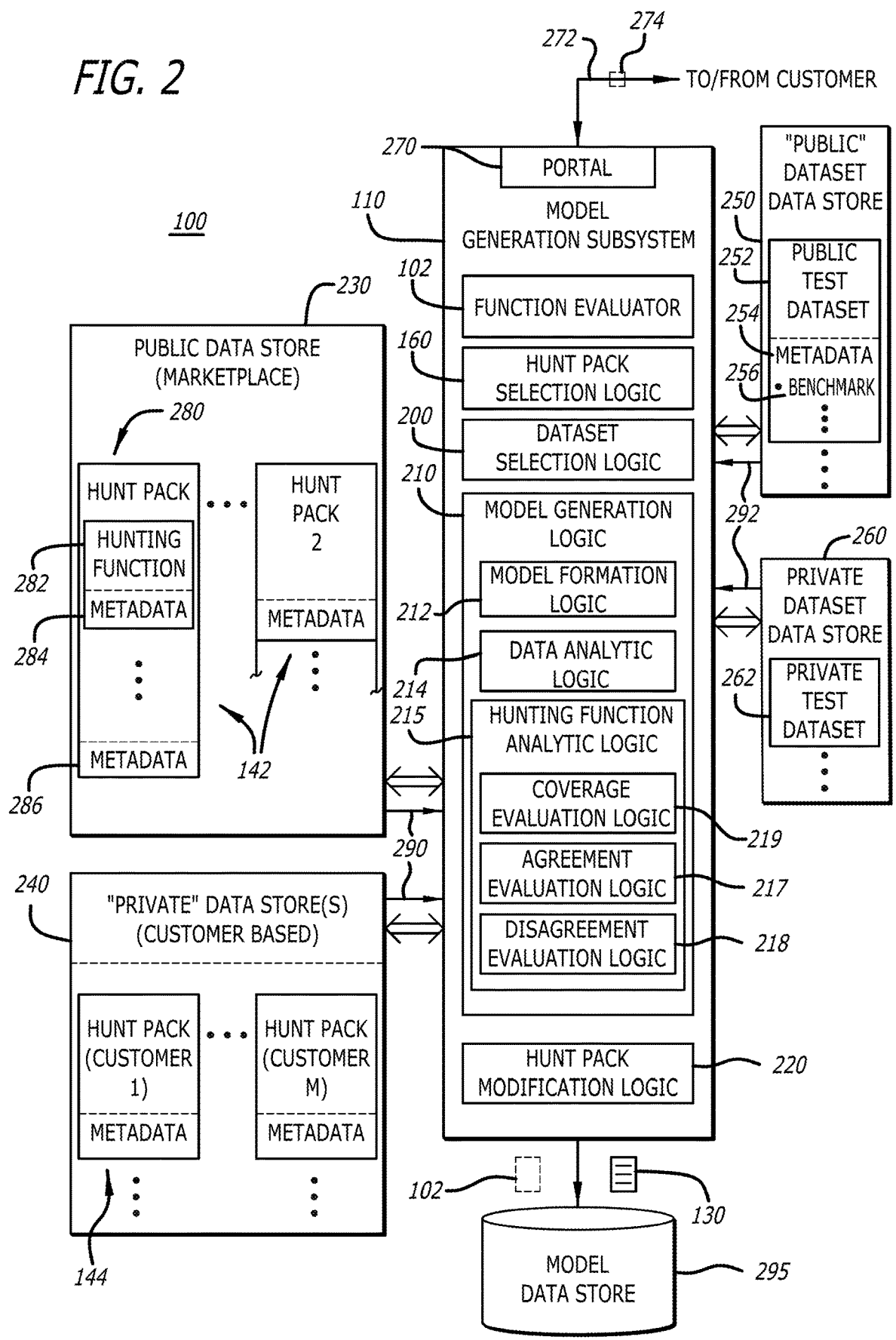
FIG. 2 is a block diagram of an exemplary embodiment of logical representation of the cybersecurity threat hunting system including the model generation subsystem.

Referring now to FIG. 2, a block diagram of an exemplary embodiment of a logical representation of the cybersecurity threat hunting system 100 of FIGS. 1A-1B, notably the model generation subsystem 110 and its operability in generating the ML model 130 is shown. According to one embodiment of the disclosure, the model generation subsystem 110 features the function evaluator 102, the hunt pack selection logic 160, dataset selection logic 200, model generation logic 210, and hunt pack modification logic 220. For retrieval of selected hunt packs, the model generation subsystem 110 is communicatively coupled to a public data store 230 and/or one or more private data stores 240. For retrieval of datasets for testing (training) of the ML model 130 during generation, the model generation subsystem 110 is communicatively coupled to one or more data stores that maintain "training" datasets, such as a public dataset data store 250 and/or a private dataset data store 260. According to one embodiment of the storage architecture, as shown, the public dataset data store 250 and the private dataset data store 260 may be configured as data stores separate from the public data store 230 and the private data store 240. According to another embodiment of the storage architecture, the public dataset data store 250 and the private dataset data store 260 may be deployed as part of the public data store 230 and the private data store 240, respectively.

Herein, the hunt pack selection logic 160 may be accessible by a customer (e.g., representative of an enterprise) via a portal 270. The portal 270 provides an "interface" for a customer to access a cloud-based (or on-premises) data store to enable the customer to upload/modify/delete its private hunt packs 144 as well as, based on customer action and/or access permission, provide one or more of the private hunt packs 144 to the model generation subsystem 110 to produce the ML model 130 for testing and subsequent release. In response to a model generation request message 272, the hunt pack selection logic 160 may be configured to provide the customer with a displayable interface that includes public hunt pack(s) 142 and/or private hunt pack(s) 144 available to the customer. The selection of the available private hunt pack(s) 144 may be based, at least in part, on a customer (or enterprise) identifier (Customer ID) 274 provided as part of the model generation request message 272 by the customer.

Herein, each of the public hunt pack(s) 142 is generally publicly available logic (e.g., software module, etc.), which may be accessed from the public data store 230 operating as a software marketplace (e.g., free, fee-based, etc.). Each public hunt pack 142 may be configured to detect threats associated with one or more selected categories. Examples of these categories may include, but are not limited or restricted to, one or more of the following: (1) certain threat type (e.g., threat actor designated threats, advanced persistent threats, ransomware, phishing, etc.); (2) industry-based threats such as (a) utility (electrical power plant, hydro-electric plant, nuclear, etc.), (b) distribution channel (e.g., pipeline distribution center, port controls, etc.), (c) technology (e.g., semiconductor, social media, search engines, etc.), or the like; and/or (3) geographic-based threats (e.g., threats that have been detected to be concentrating in certain geographic regions).

The software marketplace offered by the public data store 230 provides for gamification within the cybersecurity threat hunting system 100, where awards (e.g., royalties, monetary consideration, subscription services, tokens, points, etc.) may be earned by a submitter (e.g., individual, enterprise, etc.) offering their public hunt packs and/or hunting functions to the public. For example, the awards offered to submitters of hunt packs and/or hunting functions may be in response to achieving certain milestone such as achieving a certain measurable quality metric, achieving a prescribed amount of hunt pack usage or purchase, or the like.

As an illustrative example, each private hunt pack 144 is proprietary logic to allow an enterprise to specialize its hunting for threats based on direct knowledge of its own computing environment such as infrastructure, non-standard applications, and behaviors to monitor (e.g., industrial controls for utilities for example), or the like. In lieu of being stored on a publicly accessible software marketplace, the private hunt pack(s) 144 are maintained within a uniquely designated private data store 240, namely secured storage accessible by the customer via the portal 270.

As shown, each of the hunt packs 142/144 includes one or more hunting functions (hereinafter, "hunting function(s)") along with their corresponding metadata. Using a first hunt pack 280 as an illustrative example, the first hunt pack 280 features at least a first hunting function 282, metadata 284 directed to the first hunting function 282, and metadata 286 directed to the first hunt pack 280. The first hunting function 282 includes logic, such as one or more blocks of code for example, representing a cybersecurity professional's subject matter expertise in threat analytics. In particular, the first hunting function 282 is adapted to identify (e.g., extract) events from received input data (e.g., event data within event logs, audit logs, etc.), determine one or more verdicts (referred to as "verdict(s)") for the identified events on whether any of the events, alone or in any combination, are malicious or benign, and generate output data including the verdict(s) assigned to the input data along with the event(s) themselves. Based on the verdict(s) for the first hunting function 282 and other hunting functions, a label (i.e., classification) assigned to the input data may be determined.

According to one embodiment of the disclosure, the metadata associated with each hunting function (e.g., metadata 284 directed to the first hunting function 282) may include data representative of (i) the cost of the hunting function (e.g., monetary cost, temporal cost, etc.), (ii) quality metrics/performance in accordance with various benchmark (testing) datasets (or initially based on creator setting), (iii) information identifying how the hunting function might be used in practice (e.g., network security, endpoint security, etc.), (iv) creator information (name/location), (v) creation date (to identify "aged" hunt packs), and/or (vi) other information that would be informative to any user of the hunting function. Additionally, or in the alternative, hunt pack metadata 286 may be directed to quality metrics associated with the first hunt pack 280, which may include data representative of (i) the cost of the first hunt pack 280 and/or (ii) quality metrics associated with the first hunt pack 280. These quality metrics may be an arithmetic derivation (e.g., average, mean, weighted average, etc.) of an aggregate of the quality metrics associated with the hunting functions forming the first hunt pack 280.

More specifically, hunt packs 290 of the public hunt pack(s) 142 and/or the private hunt pack(s) 144 are selected by the customer or selected automatically based on the type of threat protection needed by an enterprise via the hunt pack selection logic 160. The selected hunt packs 290 are loaded to form part of the function evaluator 102. During a pre-production stage, an effectiveness score for the ML model 130 may be determined from quality metrics associated with the hunting functions and/or hunt packs, where illustrative operations for determining the quality metrics of the hunting functions (and therefore the hunt packs) is described below.

Referring still to FIG. 2, the dataset selection logic 200 is configured to select datasets for training of the ML model 130. More specifically, the public dataset data store 250 contains a plurality of "public" training datasets 252 along with metadata 254 associated with each of these public training datasets 252. The metadata 254 may include benchmark quality metrics 256 that serve as initial quality metric thresholds to be realized by a threat hunting model operating properly.

In contrast, the dataset selection logic 200 is configured to select "private" training datasets 262 for training of the ML model 130, where the training is desired to be more narrowly tailored and representative of the enterprise's data (e.g., dataset prior event data stored in an event log, network traffic, etc.). The private training datasets 262 may not feature reliable benchmark quality metrics given the lack of exposure of the private training datasets 262 in other testing situations. Normally, the private training datasets 262 are accessed for fine-tuning of the ML model 130 after training is substantially completed with the public training datasets 252.

Herein, as shown in FIG. 2, the model generation logic 210 includes model formation logic 212, data analytic logic 214, and hunting function analytic logic 215, which are configured to collectively operate so that the model generation logic 210 operates in a plurality of operational phases: a model generation phase, a training phase, and a quality metric assignment phase. In particular, during the model creation phase, the model formation logic 212 is adapted to receive selected hunt packs from the hunt pack selection logic 160 for inclusion into the function evaluator 102. The model formation logic 212 may be configured to order and link operability of the selected hunt packs 142/144 to operate with the ML model 130. The model formation logic 212 may also receive an initial ML model 128, which can be obtained as a publicly available (e.g., "open source) ML model or can be developed by data scientists retained for that purpose.

After the ML model 130 is formed, during training phase, the data analytics logic 214 is configured to perform analytics on the "training" datasets as supplied by the dataset selection logic 200 to the hunting function(s), deployed within the selected threat hunt packs 290. These analytics are conducted to monitor the operability of the hunting functions by recordation of which events occur based on results realized from operability of the threat hunt packs 290 to extract features from a collection of public and/or private training datasets (dataset(s)) 292. From these analytic results, the hunting function analytic logic 215 is configured to determine the quality metrics associated with each hunting function included in the selected hunt packs 290. Thereafter, the hunting function analytic logic 215 may be configured to determine the quality metrics associated with each of the hunt packs 290 and, as an aggregate of the determined quality metrics for the hunt packs 290 of the ML model 130.

More specifically, the hunting function quality logic 215 is configured to determine quality metric associated with each hunting function. In some embodiments, each set of quality metrics is generated based on (i) how often the associated hunting function votes (i.e., does not abstain) on extracted features, (ii) which other hunting function(s) from multiple hunting functions agree with the associated hunting function on the verdict for the extracted feature, (iii) which other hunting function(s) from multiple hunting functions disagree with the associated hunting function on the extracted feature, and/or (iv) the observed correlation among the hunting functions in agreement or disagreement with the associated hunting function. In general, quality metrics may be arranged to improve (e.g., increase in value) when a given hunting function votes (i.e., does not abstain) on a large volume of events and agrees with a wide variety of other hunting functions. Conversely, quality metrics may be arranged to degrade (e.g., decrease in value) when a given hunting function rarely votes, does not vote, disagrees with a wide variety of other hunting functions, or agrees with only a small subset of correlated hunting functions. Based on operations conducted by the hunting function quality logic 215, a plurality of quality metrics for each hunting function are output. These quality metrics can be used as parameters of the ML model 130.

Herein, in some embodiments, each quality metric constitutes a binary classification into malicious or benign classes, where the quality metric may correspond to a true positive ("TP") value, a false positive ("FP") value, a true negative ("TN") value, or a false negative ("FN") value. According to one embodiment of the disclosure, a quality metric represents a level of accuracy in the hunting function identifying threats associated with the training dataset. For example, the TP value represents a likelihood of the hunting function or hunt pack labeling a dataset as a potential threat consistent with a majority of other similarly situated hunting functions. Similarly, the TN value represents a likelihood of the hunting function or hunt pack labeling a dataset as benign consistent with a majority of other similarly-situated hunting functions; the FP value represents a likelihood of the hunting function or hunt pack labeling a dataset as a potential threat inconsistent with a majority of other similarly-situated hunting functions; and/or the FN value represents a likelihood of the hunting function or hunt pack labeling a dataset as benign inconsistent with a majority of other similarly-situated hunting functions.

Further information on determining and using quality of the hunting functions can be had with reference to commonly owned U.S. patent application Ser. No. 17/855,255, entitled "CYBER-THREAT SCORE GENERATION USING MACHINE LEARNING AND REFLECTING QUALITY OF SOURCES," filed Jun. 30, 2022, by Scott Eric COULL et al. (Mandiant Ref.: M01-2110.02, (which has a U.S. patent Continuation application presently pending), the full disclosure of which is incorporated herein by reference. It should be understood that sources described therein may be understood for purposes of understanding embodiments of the current invention as corresponding to hunting functions or hunt packs herein.

In some implementations, the plurality of quality metrics remains constant until the ML model 130 is retrained. Retraining of the ML model 130 can be triggered, for example, by any of one or more of the following: (1) in response to detecting drift in the performance of an underlying hunting function (such that the trained threat hunting model 130 may no longer be accurate), (2) in response to detecting drift in performance of the ML model 130, for example due to a degradation in the relevant features are no longer being extracted, for example, due to changes in TTP or the threat landscape, and (3) based on a predefined schedule (e.g., periodic intervals such as monthly, quarterly, semi-annual, annual, etc.).

Herein, the quality metric for each hunting function may be determined by both (i) the agreement evaluation logic 217 based on the level of agreement (TP, TN) with other similarly situated hunting functions that assigned a similar label (classification) to features of the training datasets and (ii) the disagreement evaluation logic 218 based on the level of disagreement (FP, FN) with other similarly situated hunting functions to the training datasets. A "benchmark" or threshold value may constitute, for example, desired quality values for implementing threat hunting models operating to prescribed standards.

More specifically, a quality value for the hunting function is generated based on the quality metrics and the votes for the classification of a feature. Note that, as discussed above, not all hunting functions may have previously provided a vote for a given feature. One or more of the hunting functions from which information was gathered during training may have "abstained" from voting, e.g., due to a lack of applicable information to vote. For example, a hunting function may not be designed to render a vote for the particular type of event. Each of the votes (from non-abstaining sources) may be weighted (e.g., using Bayesian probability) based on the quality metrics determined for the hunting function, and the weighted votes can be aggregated and normalized into the quality value or score (e.g., within a scale from 0 to 1), which is an over-arching probability of accuracy associated with new hunting function. While the description in this paragraph and the following paragraphs relate for purposes of ease in description to a single new hunting function, the embodiments contemplate the use of this approach for a set of related hunting functions, such as a particular hunt pack, where the weight may be assigned to the hunt pack rather than or in addition to weights being assigned to individual hunting functions within the hunt pack.

In one example implementation, votes for three different hunting functions can be obtained during testing, and their votes with respect to a test event might be as shown in Table 1, below:

TABLE 1

Example hunting function votes and applicable quality metrics for a given event

| Hunting Function | Classes of Potential Votes | Quality Metrics Applied |
| --- | --- | --- |
| 1st Hunting Function | malicious, benign, abstain | TP, FP, TN, FN |
| 2nd Hunting Function | malicious, abstain | TP, FP |
| 3rd Hunting Function | malicious, benign, abstain | TP, FP, TN, FN |

As shown in Table 1, when a source votes "malicious," the applicable quality metrics are TP and FP, whereas when a source votes "benign," the applicable quality metrics are TN and FN. It is possible for the hunting function to vote for both classes of malicious and benign. As such, in the binary classification setting, for example, it might be useful to refer to those hunting functions that only provide votes regarding an event for one class as 'unipolar' and those for both classes as bipolar.

Table 2, shown below, illustrates an example visualization of relationships among different events, hunting functions, and votes. In Table 2, in an example implementation, events provided as part of the input data may be presented as rows, hunting functions may be presented as columns, and each cell may represent a vote.

TABLE 2

Example visualization of events, sources, and votes

| Event: | Hunting Function No. 1 | Hunting Function No. 2 | Hunting Function No. 3 | Hunting Function No. 4 |
| --- | --- | --- | --- | --- |
| Event #1 | abstain | benign | malicious | malicious |
| Event #2 | abstain | malicious | abstain | malicious |
| Event #3 | benign | malicious | malicious | benign |
| . | . | . | . | . |
| . | . | . | . | . |
| . | . | . | . | . |

In summary, besides a potential initial setting of a quality value for each of the hunt packs by their creator, the determination and setting of the quality metric for the hunting function may be determined based on iterative analytics on the training datasets conducted by each hunting function to determine quality metric (TP, FP, TN, FN). Herein, the quality metric may be based, at least in part, on a level of labeling agreements determined by the agreement evaluation logic 217 and a level of disagreements determined by the disagreement evaluation logic 218.

If the quality metric of a hunt pack satisfies a first threshold, representative of a desired value in which the hunt pack has a prescribed level of operability to detect threats pertaining to the training datasets, the hunt pack may be retained as part of a function evaluator 102. For hunt pack(s) that fail to satisfy the first threshold, according to one embodiment of the disclosure, the hunt pack modification logic 220 may be configured to alter the hunt pack(s), such as substitute the hunt pack(s) for other hunt packs(s) or add additional hunt pack(s) to the function evaluator 102 to improve its operability.

Besides the quality metric, coverage evaluation logic 219 of the hunting function analytic logic 215 is configured to determine a coverage value associated with the hunting function. In general, according to one embodiment of the disclosure, the coverage value is a measure of the capability of a hunting function or a hunt pack to classify events including in received data. As an illustrative embodiment, the coverage value may represent a number of events (event_number) or a percentage of total events (event_percentage) within one or more datasets that are labeled (e.g., classified or voted on as malicious, benign, etc.) instead of abstaining due to the hunting function's inability to render a decision based on the received data. Stated differently, the coverage value indicates the event_number or event_percentage from event data that is classified by the hunting function instead of abstaining from such classification. Coverage below a prescribed threshold may signal that the hunting function is not fully assisting the hunting process and signify modification or deletion of the hunting function or substitution for another hunting function may be warranted.

The trained threat hunting model 130, after completion of training (with quality values exceeding prescribed thresholds), may be released. Now, cybersecurity threat hunting system 100 may be configured to store the trained, threat hunting model 130 and the function evaluator 102 on which it was trained within a threat model/function evaluator data store 295 until use during post-production stage operations of the cybersecurity threat hunting system 100.

Figure 3:
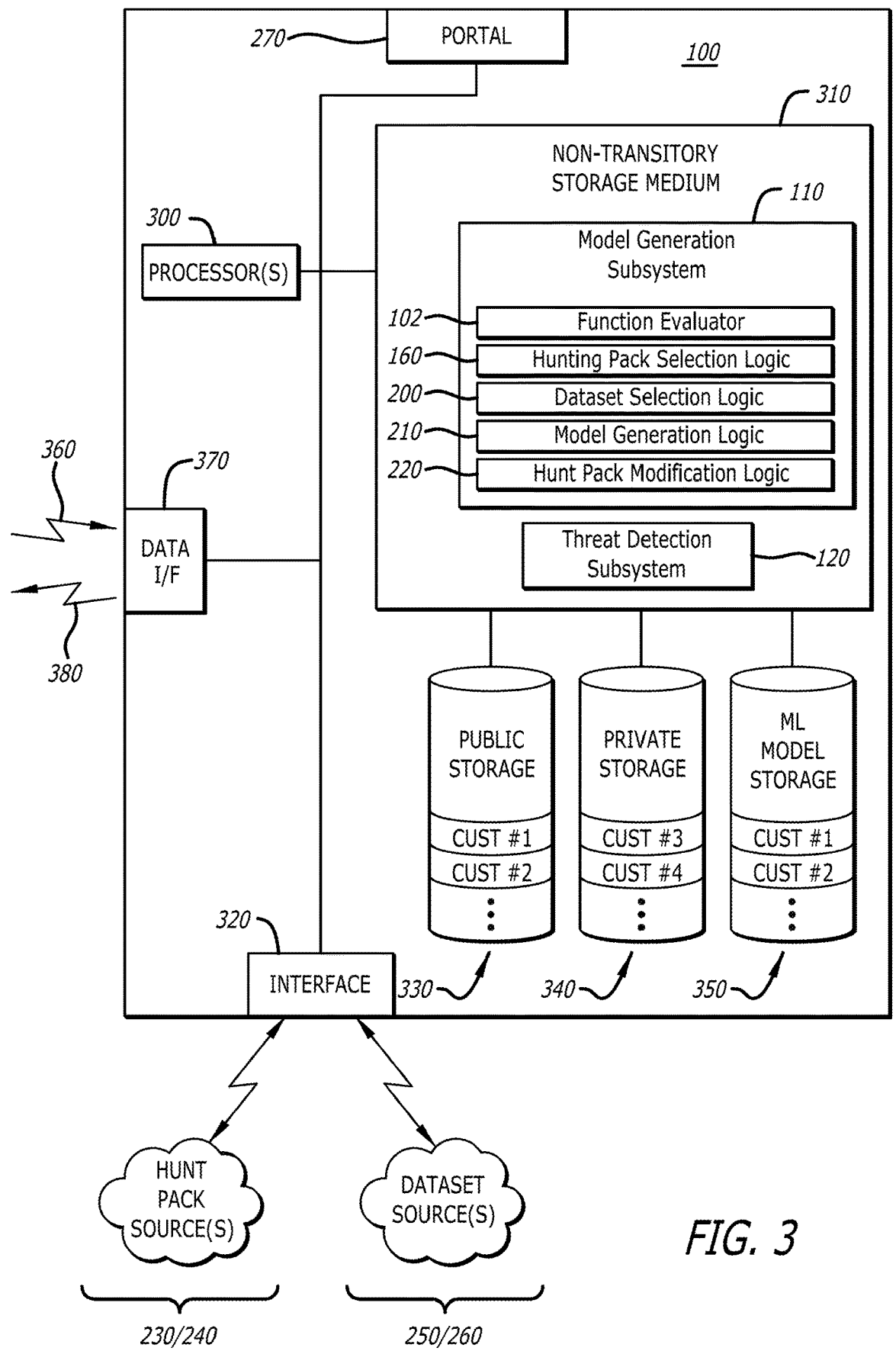
FIG. 3 is a block diagram of an exemplary embodiment of physical representation of the cybersecurity threat hunting system of FIG. 2.

Referring now to FIG. 3, a block diagram of an exemplary embodiment of a physical representation of the cybersecurity threat hunting system 100 of FIG. 1B is shown, notably the model generation subsystem 110 and its operability in generating the ML model 130 is shown. Herein, the cybersecurity threat hunting system 100 includes one or more processors 300 and a non-transitory storage medium 310. The cybersecurity threat hunting system 100 is communicatively coupled to a plurality of data stores, such as the public/private data store(s) 230/240 and/or the public/private dataset data store(s) 250/260, for example.

In some deployments, the processor(s) 300 may be construed as a hardware processor while, in other deployments, the processor(s) 300 may be construed as one or more virtual processor such as one or more processor-based instances (e.g., Amazon Web ServicesR EC2 instances, etc.). The non-transitory storage medium 310 includes the function evaluator 102, hunt pack selection logic 160, the dataset selection logic 200, the model generation logic 210, and the hunt pack modification logic 220 as described above. Each of these components may be executed by the processor(s) to perform the operations described above.

According to one embodiment of the disclosure, the cybersecurity threat hunting system 100 may include local data stores, such as a public (non-transitory) storage 330, a private (non-transitory) storage 340 and an ML model (non-transitory) storage 350. The public storage 330 constitutes a non-transitory storage medium that is configured to maintain hunt packs 142 pertaining to the public data store 230 and/or public training datasets 252 pertaining to the public dataset data store 250 as shown in FIG. 2. Hence, the public storage 330 may operate as a localized version of the public data store 230 and/or the public dataset data store 250 or may operate as cache storage for some of the public hunt packs 230 and/or training datasets 252.

Similarly, the private storage 340 constitutes a non-transitory storage medium that is configured to maintain some or all of hunt packs 285 pertaining to the private data store 240 and/or private training datasets 262 pertaining to the private dataset data store 250. The ML model storage 350 constitutes a non-transitory storage medium that is configured to maintain trained, threat hunt models produced by the model generation subsystem 110 and utilized by the threat detection subsystem 120. Some or all of these storages 330, 340 and/or 350 may be segmented by customer to provide isolation and access protection of each customer's data.

Additionally, or in the alternative, the cybersecurity threat hunting system 100 may utilize remote data stores, such as cloud-based (non-transitory) storage. The cloud-based storage maintains the hunt packs included within the public data store 230 and/or private data store 240 and/or datasets included within the public dataset data store 250 and the private dataset data store 260.

The threat detection subsystem 120 may be configured with a trained, threat hunting model and the function evaluator on which it was a trained to conduct analytics on event data, i.e., features as part of input data 360 received via data interface 370. Herein, the input data 360 may be provided from different sources (e.g., logs, security controls, etc.) and determine whether any potential threats are associated with the input data 360. Analytic results 380 (e.g., alerts, malicious events for subsequent analysis, etc.) may be provided via the data interface 370 or another interface. The portal 270 allows the customer to upload, delete, substitute hunt packs, hunting functions and/or datasets maintained within and accessible by the model generation subsystem 110.

IV. Operability—Cybersecurity Threat Hunting System

Figure 4:
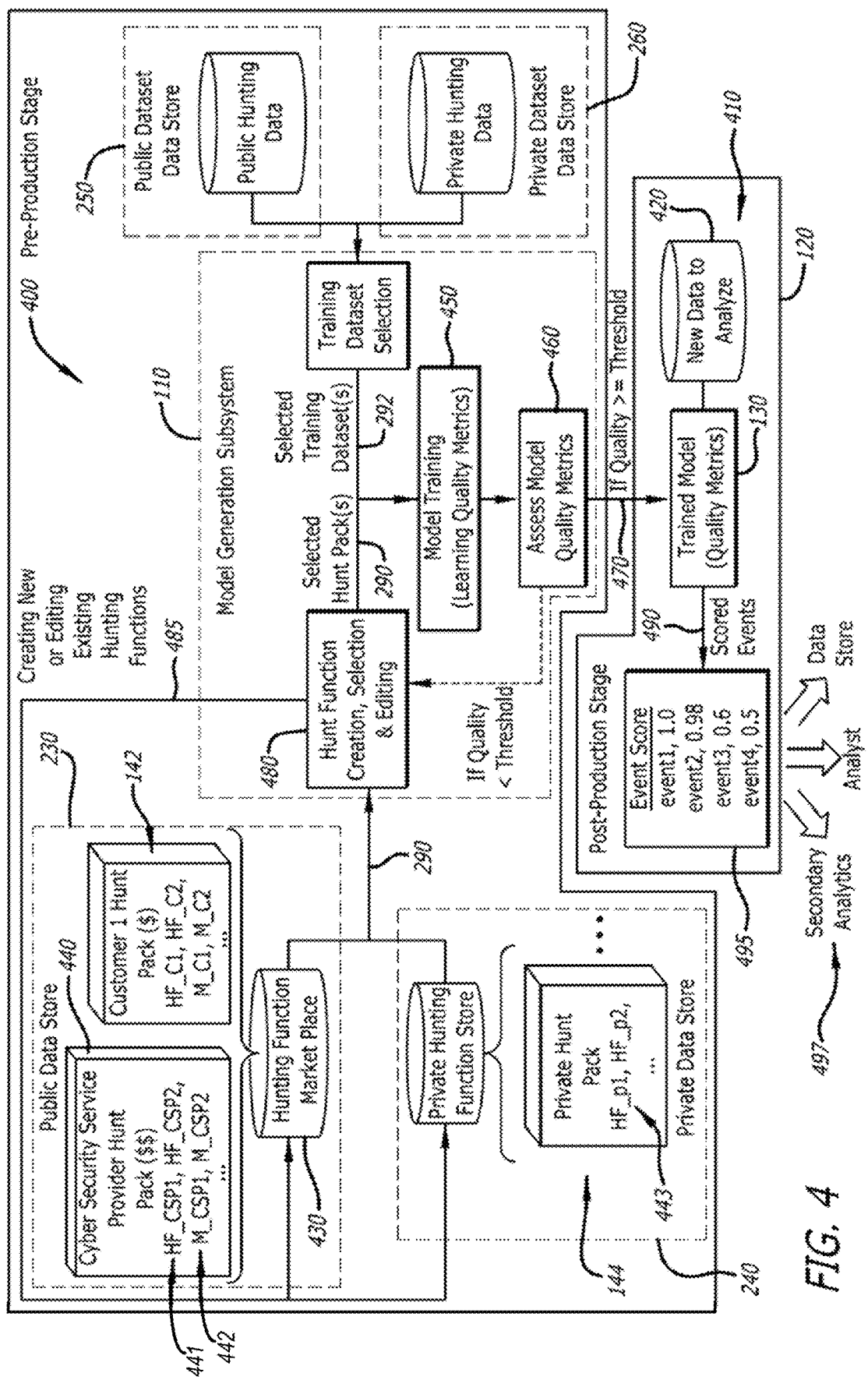
FIG. 4 is a system diagram of illustrating operational flows of components formulating the model generation subsystem of FIGS. 2-3.

Referring now to FIG. 4, a system diagram of illustrating operational flows of components formulating the model generation subsystem 110 of FIGS. 2-3 is shown. Herein, a first set of operations 400 is directed to operations of the model generation subsystem 110 of FIG. 1B during a training or pre-production stage. A second set of operations 410 is directed to operations of the cybersecurity threat hunting system 100 of FIG. 1B during a post-production stage. The operations of the model generation subsystem 110 during the pre-production stage are intended to produce a trained, threat hunting model 130, which is supplied to the threat detection subsystem 120 as shown in FIG. 1B. The operations of the threat detection subsystem 120 during the post-production stage are intended to conduct analytics on selected event data 420 to determine likelihoods of any of such data including cybersecurity threats, denoting further investigation of these event data 420 is warranted.

As shown, each of the public hunt packs 142 are maintained in a hunting function marketplace 430; namely, the public hunt packs 142 are maintained within the public data store 230 that is accessible by different customers of the cybersecurity threat hunting system. For instance, a first hunt pack 440 provided from a cybersecurity service provider features a plurality of hunting functions (HF_CSP1, HF_CSP2, etc.) 441 along with corresponding metadata (M_CSP1, M_CSP2, etc.) 442 that reflects the cost of the hunting function, quality metrics/performance of that hunting function based on various benchmark datasets, and other information that would dictate how they might be used in practice (network data analytics, endpoint data analytics, etc.).

Additionally, for each customer, one or more private hunting functions 443 (HF_p1, HF_p2) of the private hunt packs 144 are stored within the private data store 240 of FIG. 2. Herein, for example, the private hunting functions 443 allow each customer to specialize threat hunting based on its knowledge of its own computing environment and/or non-standard behaviors or applications in its computing environment. A collection of public and/or private hunt packs 290 may be selected as part of the ML model 130 for analysis.

As further shown, each training dataset within the public dataset data store 250 may be used for benchmarking, publicly available quality metrics on public hunt packs. The public dataset data store 250 supports gamification with third parties allowed to upload training datasets that may be purchased for use or the third-party supplier and receive an award based on the submission and success of the training dataset. In contrast, the private dataset data store 260 features one or more private training datasets, which may be used as a representative sample of production usage to validate quality and fine-tune the ML model 130 on real-world data. A collection of public and/or private training datasets (dataset(s)) 292 may be selected as part of the ML model 130 for analysis.

Upon receipt of the selected hunt packs 290 and the training dataset(s) 292, during a training phase, the model generation subsystem 110 operates the threat hunting engine 102 (see FIG. 1A) to generate a set of quality metrics for each hunting function and/or selected hunt packs 290 based on analytics on verdicts on extracted features included in the training dataset(s) 292. More specifically, hunting functions within the selected hunt packs 290 generate verdicts treated as votes associated with each extracted feature included in the one or more training dataset(s) 292. By comparison of agreements and/or disagreements between votes generated by the hunting functions within the selected hunt packs 290, the model generation subsystem 110 may compute quality metrics associated with each of the hunting functions and hunt packs. Herein, the training dataset(s) 292 may constitute unlabeled data in accordance with a fully unsupervised analytic setting or may include a relatively small amount of labeled data in a weakly supervised analytics setting that would include data associated with known attacks and/or benign events to accompany the unlabeled data.

From the vote agreements/disagreements, the model generation logic 210 of FIGS. 2-3 may determine the quality metrics associated with the hunt packs and hunting functions deployed with the hunt packs incorporated within the function evaluator (operation 450). Also, the model generation logic 210 may determine the coverage value, which measures the capability of a hunting function or pack to classify events and also identifies the amount of weighting that each hunting function/hunting pack should be accorded in the determination of the threat score by the ML model 130. These values and the accuracy of the threat score may be compared against predetermined thresholds and combined into an effectiveness score for the ML model 130 to determine whether release of the ML model 130 into post-production operations is warranted (operation 470).

Where the quality metrics of any of the hunt packs is less that a prescribed (first) threshold, the hunt pack may be substituted and replaced, and where quality metrics of one or more hunting packs associated with a hunt pack is less that a prescribed (second) threshold, those hunting functions may be substituted or edited (operations 480 & 485). The first threshold may be a static threshold, or dynamic threshold that may vary depending on the type of features, the type of threat hunting model being created and/or the customer for which the ML model is created. Similarly, the quality metrics of any of the hunting functions may be static or dynamic depending on certain parameters of the hunting function (e.g., type, developer, targeted industry, etc.). The first threshold denotes a lesser correlation of its results to a successful (or accurate) determination than the second threshold.

As an illustrative example, during update, a hunt pack may be substituted for a similarly situated hunt pack or the function evaluator may be augmented with another hunt pack that may perform operations that were not effective or absent from the other hunt pack. Similarly, where the quality metrics of a hunting function are less that the prescribed (second) threshold, a hunting function may be substituted for a similarly-situated hunting function, or may be added to augment a hunt pack to perform operations that were not effective or absent from the previously included hunting function or functions of that hunt pack, and/or altered (e.g., undergo code or rule changes) to improve operability of the hunting function, and thus, improve operability of function evaluator and/or the ML model.

As an alternative, where the quality metrics of the hunt pack is less that the prescribed (first) threshold, the model generation logic may conduct a secondary test using a second training dataset. Such operations may be performed to avoid situations where less optimal performance by a hunt pack or hunting function is simply due to the particular training dataset or of the weightings assigned during training.

During the post-production stage, the threat detection subsystem 120 of the cybersecurity threat hunting system 100 is configured to operate the threat hunting engine 180 on the production data 420, namely input data that may include event data actually collected from firewall logs, endpoint events, alerts, or the like, in protecting an enterprise. The trained, threat hunting (ML) model 130 has been adjusted (trained) using the quality metrics (TP, TN, FP, FN values (which may take the form of numerical values, rates, or percentages) as weighting parameters applied to 'votes' on events from the hunting functions of the function evaluator. Tuned using the 'votes," the ML model 130 receives event data for analysis and produces a threat score associated with the inputted event data.

Herein, high threat scored events indicate a likelihood of a cybersecurity attack (operation 495).

The simplest labeling scheme for detecting threats would classify (label) features by hunting functions in accordance with general binary classifications (malicious, benign, or abstain), although any number of other types of classifications (labels) may be utilized. The event scores may be provided directly to the ML model 130, to a secondary system to perform further analytics on the input data (and its corresponding event), to an analyst to verify the results, and/or to a data store for subsequent evaluation (operation 497).

Figure 5:
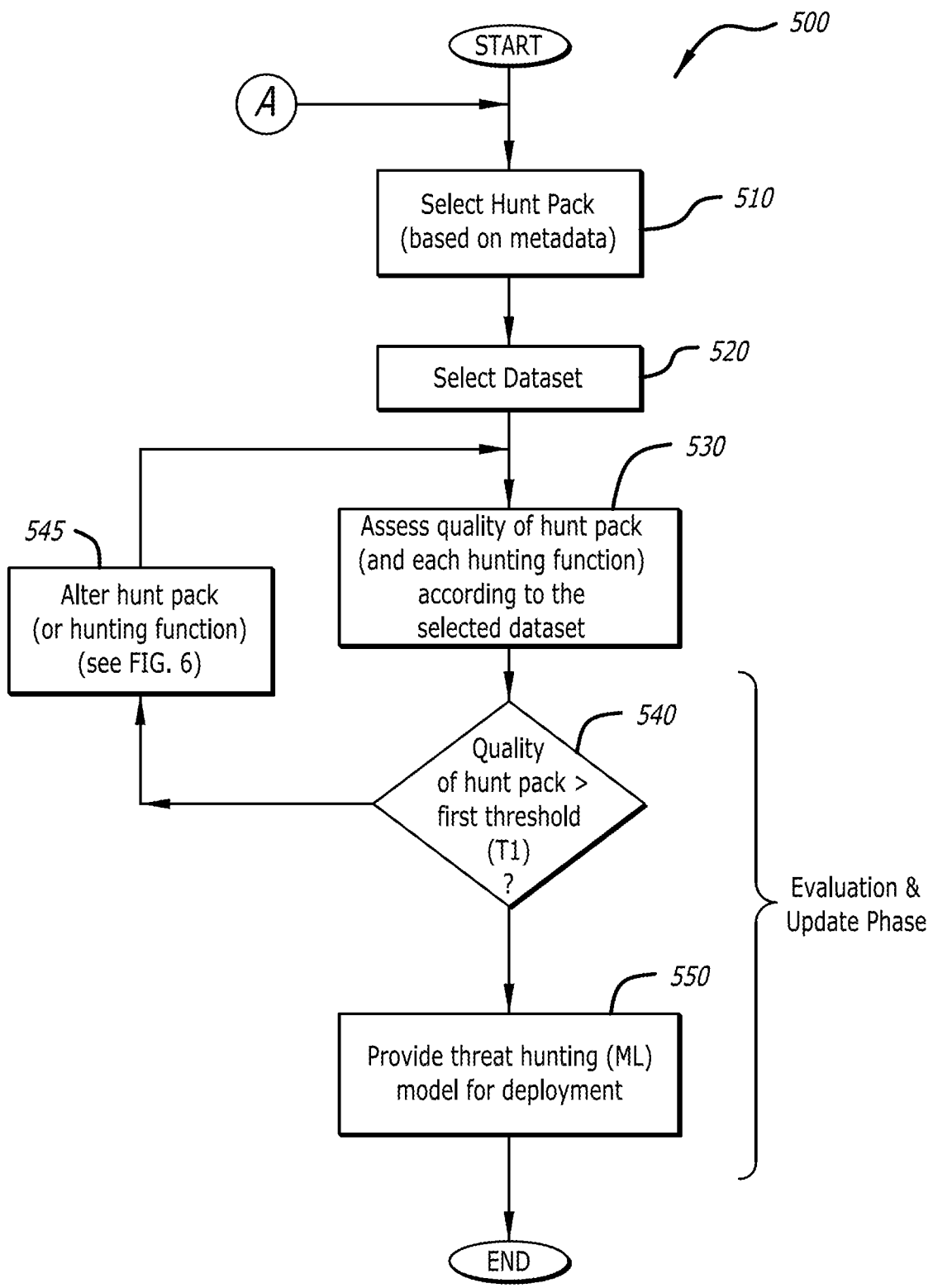
FIG. 5 is an exemplary flowchart of the operations performed during evaluation of a hunt pack and its hunting function(s) by the model generation subsystem of FIGS. 1B-3.

Referring to FIG. 5, an exemplary flowchart of the operations performed during testing of a hunt pack inclusive of one or more hunting functions, by the model generation subsystem of FIGS. 1B-3 is shown. Herein, one or more hunt packs may be selected to formulate a function evaluator (operation 500). Such selection may be conducted by cybersecurity personnel on behalf of an enterprise or automated by the cybersecurity threat hunting system. For training of the ML model, a plurality of training datasets are selected (operation 510). Thereafter, the ML model, operating with the selected hunt pack(s), conducts analytics on incoming (training) datasets that generate a number of quality metrics and coverage values associated with the ML model as well as components associated with the ML model including hunting functions within the hunt pack(s) along with each hunt pack (operation 520).

Thereafter, the quality metrics and coverage value associated with each hunting function is analyzed to determine whether the hunting function should be retained, substituted, modified, or augmented with another hunting function that addresses non-optimal operational components of the hunt pack (operation 530). This analysis may involve one or more comparisons of certain quality metrics (e.g., TP or TN value, FP, or FN value, etc.) to prescribed thresholds. In the event that one or more quality metrics associated with hunting functions fail to satisfy the prescribed threshold(s), the hunting function/hunt pack may be altered (operations 540-545). The alteration may include, but is not limited or restricted to (i) an alteration of one or more hunting functions, (ii) a substitution of one or more hunting functions, (iii) an addition of one or more hunting functions, (iv) an alteration of one or more hunt packs, (v) a substitution of one or more hunt packs, and/or (vi) an addition of one or more hunt packs. However, if the quality metrics and coverage value associated with each hunting function satisfies the prescribed thresholds, function evaluator and the ML model may be provided to the threat detection subsystem 120 of FIG. 1B for analyses in production on security-related event data to identify threats that may be detected from such event data (operation 550).

Figure 6:
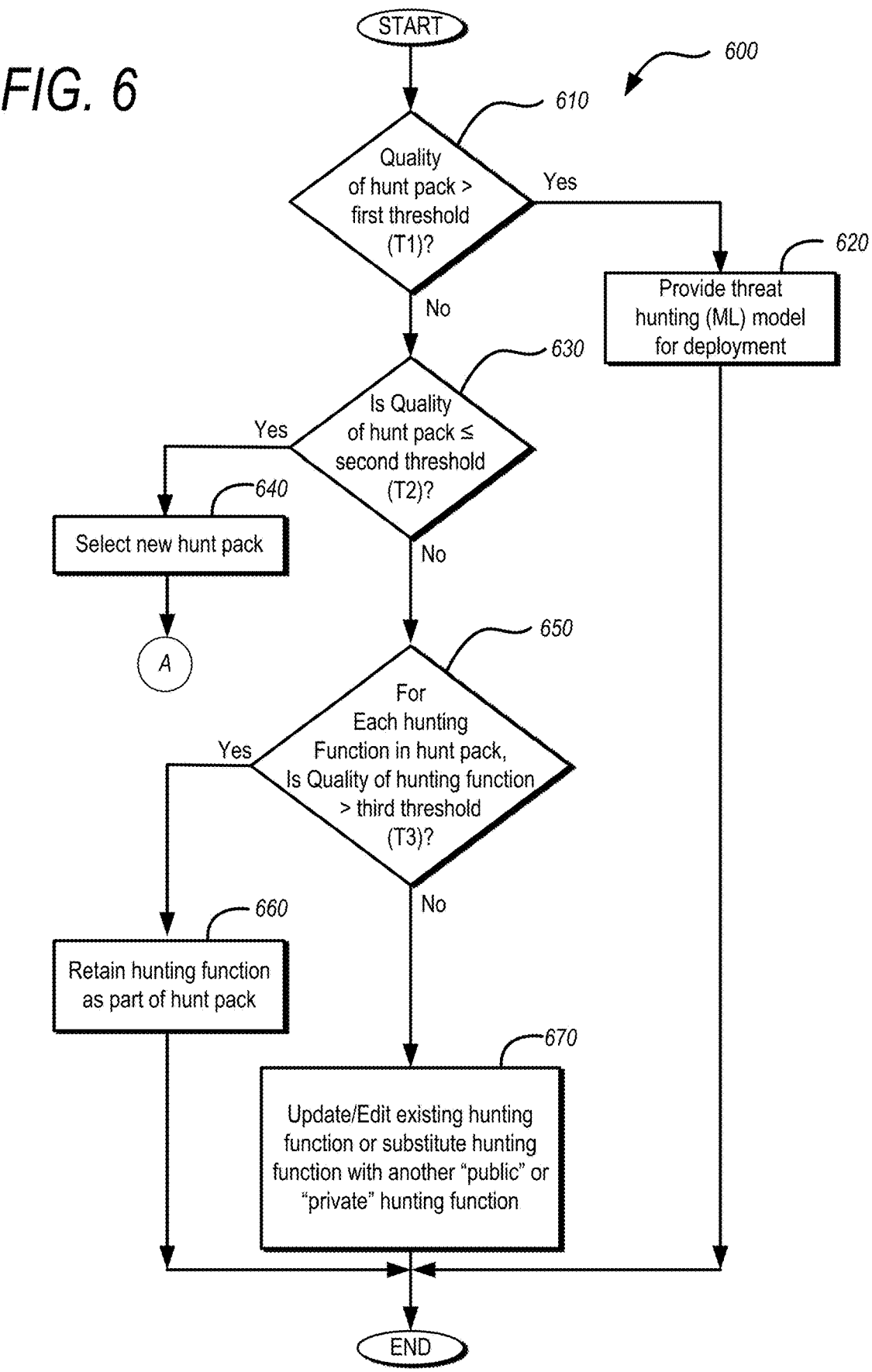
FIG. 6 is an exemplary flowchart of hunt pack alteration process performed based on results of evaluating of the hunt pack and its hunting function(s) by the model generation subsystem of FIGS. 1B-3.

Referring to FIG. 6, an exemplary flowchart of hunt pack alteration process performed based on results of the testing of the hunting function by the model generation subsystem of FIGS. 1B-3 is shown. Herein, the quality metrics associated with a hunt pack may be determined in comparison with a first threshold (T1) to determine whether the hunt pack is operating properly against the training datasets (operation 610). If so, the hunt pack is retained as part of function evaluator for the ML model (operation 620). If not, a secondary determination is conducted in which the quality metrics of the hunt pack is compared against a second threshold. If the hunt pack satisfies the second threshold denoting a mismatch as to desired operability, the hunt pack is removed and substituted for a different hunt pack (operations 630-640).

Thereafter, analytics are conducted on the hunting functions. For each hunting function, a determination is made as to whether the hunting function satisfies a prescribed threshold that denotes a satisfactory level of operation by the hunting function (operation 650). If so, the hunting function is retained as part of the hunt pack included as part of the ML model (operation 660). If not, the hunting function is updated, which may include the alteration of a parameter within the hunting function, substitute of the hunting function with another hunting function, or addition of another hunting function as part of the hunt pack (operation 670).

In the foregoing description, the invention is described with reference to specific exemplary embodiments thereof. However, it will be evident that various modifications and changes may be made thereto without departing from the broader spirit and scope of the invention as set forth in the appended claims.

What is claimed is:

1. A non-transitory storage medium including logic associated with a cybersecurity threat hunting system that, upon execution, performs operations comprising:
receiving event data pertaining to activities of a computing device or network;
analyzing the event data to detect whether the event data constitutes a cyberthreat;
extracting, based on use of a function evaluator, features of the event data, wherein the function evaluator is configured to extract features from the event data that are relevant, based on experiential knowledge or past analyses, for use in determining whether one or more cyberthreats are associated with the event data,
wherein the function evaluator comprises one or more hunt packs, each of the one or more hunt packs includes one or more hunting functions,
wherein each hunting function of the one or more hunting functions is configured to analyze the event data received from at least one cybersecurity source and generate one or more verdicts that are weighted and indicate whether the extracted features are associated with the cyberthreat,
and wherein each verdict of the one or more verdicts is weighted based on an accuracy of the one or more hunting functions corresponding to each verdict; and
determining, based on inputting one or more verdicts into a machine-learning model, a threat score that represents a probability that the event data corresponds to the cyberthreat,
wherein the one or more hunt packs include one or more private hunt packs or one or more publicly available public hunt packs that are used to generate verdicts based on an analysis of the extracted features defined in the one or more hunting functions in tuning the machine learning (ML) model,
and wherein the ML model is configured for use in identifying, analyzing, and classifying the cyberthreat.

2. The non-transitory storage medium of claim 1, wherein the event data pertains to activities or behaviors of a user.

3. The non-transitory storage medium of claim 1, wherein each public hunt pack of the one or more public hunt packs is configured to extract features that detect threats associated with (i) a particular threat type, (ii) a particular industry, (iii) a particular distribution channel, (iv) a particular technology type, or (v) a particular geographic location.

4. The non-transitory storage medium of claim 1, wherein each hunting function of the one or more hunting functions is selected and configured to extract the features and produce a verdict as an output based on an analysis of the extracted features defined in the hunting pack that indicates whether the extracted features are associated with the cyberthreat.

5. The non-transitory storage medium of claim 4, wherein the verdict is in a form of a probability level for the extracted feature expressing a likelihood that the extracted feature is malicious or related to a cyberattack.

6. The non-transitory storage medium of claim 1, wherein each hunting function of the one or more hunting functions is logic designed specifically to identify a predetermined cyberthreat.

7. The non-transitory storage medium of claim 6, wherein each hunting function of the one or more hunting functions is based on cybersecurity analysts' subject matter expertise in threat analyses and collected threat intelligence that is designed specifically to identify the predetermined cyberthreat or a range of cyberthreats associated with a recognized malware family or a threat attacker group.

8. The non-transitory storage medium of claim 1, wherein the one or more hunt packs further include one or more private hunt packs, each private hunt pack of the one or more private hunt packs is proprietary or specialized software module suitable for use by an enterprise that allows the enterprise to concentrate a hunting for cyberthreats based on attributes specifically known by the enterprise, the attributes include direct knowledge of a network infrastructure of the enterprise or known cybersecurity risks targeting similarly situated enterprises or the enterprise.

9. A computing device comprising:

a processor; and a non-transitory storage medium communicatively coupled to the processor, the non-transitory storage medium including one or more instructions that when executed by the processor cause the processor to perform operations comprising:

receiving event data pertaining to activities of a computing device or network;

analyzing the event data to detect whether the event data constitutes a cyberthreat;

extracting, based on use of a function evaluator, features of the event data, wherein the function evaluator is configured to extract features from the event data that are relevant, based on experiential knowledge or past analyses, for use in determining whether one or more cyberthreats are associated with the event data, wherein the function evaluator comprises one or more hunt packs, each of the one or more hunt packs includes one or more hunting functions, wherein each hunting function of the one or more hunting functions is configured to analyze the event data received from at least one cybersecurity source and generate one or more verdicts that are weighted and indicate whether the extracted features are associated with the cyberthreat, and wherein each verdict of the one or more verdicts is weighted based on an accuracy of the one or more hunting functions corresponding to each verdict; and determining, based on inputting one or more verdicts into a machine-learning model, a threat score that represents a probability that the event data corresponds to the cyberthreat, wherein the one or more hunt packs include one or more private hunt packs or one or more publicly available public hunt packs that are used to generate verdicts based on an analysis of the extracted features defined in the one or more hunting functions in tuning the machine learning (ML) model, and wherein the ML model is configured for use in identifying, analyzing, and classifying the cyberthreat.

10. The computing device of claim 9, wherein the event data pertains to activities or behaviors of a user.

11. The computing device of claim 9, wherein the one or more public hunt packs are obtained from a public data store operating as a software marketplace.

12. The computing device of claim 11, wherein the public data store operating as the software marketplace allows gamification of the one or more hunt packs, where an award is earned by an author or supplier for a first public hunt pack loaded and maintained within the public data store in response to a triggering condition including the first public hunt pack having a measurable quality.

13. The computing device of claim 9, wherein each public hunt pack of the one or more public hunt packs pack is configured to extract data that detect threats associated with (i) a particular threat type, (ii) a particular industry, (iii) a particular distribution channel, (iv) a particular technology type, or (v) a particular geographic location.

14. The computing device of claim 9 wherein each hunting function of the one or more hunting functions, during a training phase, is selected and configured to (i) extract features from one or more training datasets and (ii) produce a verdict as an output based on an analysis of the extracted features defined in the hunting pack that indicates whether the extracted features are associated with a potential cyberthreat.

15. The computing device of claim 14, wherein the verdict is in a form of a probability level for the extracted feature expressing a likelihood that the extracted feature is malicious or related to the cyberthreat.

16. The computing device of claim 9, wherein the operations further comprise:

determining whether the threat score exceeds a threshold; and based on the threat score exceeding a threshold, performing automated actions in response to the cyberthreat.

17. The computing device of claim 16, wherein the automated actions comprise generating an alert or generating a report.

18. The computing device of claim 9, wherein the event data comprises event logs, audit logs, firewall logs, or security related data.

19. The computing device of claim 9, wherein the operations further comprise:

training the machine-learning model based on a training dataset comprising a first set of event data and cybersecurity classifications from the one or more hunting functions.

20. The computing device of claim 19, wherein the training dataset further comprises a set of initial quality values indicative of estimates of qualities of each hunting function of the one or more threat hunting functions.

21. The non-transitory storage medium of claim 1, wherein the operations further comprise:

determining whether the threat score exceeds a threshold; and based on the threat score exceeding a threshold, performing automated actions in response to the cyberthreat.

22. The non-transitory storage medium of claim 1, wherein the operations further comprise:

training the machine-learning model based on a training dataset comprising a first set of event data and cybersecurity classifications from the one or more hunting functions.

* * * * *